United States Patent [19]

Jones, Jr. et al.

[11] Patent Number: 4,753,114
[45] Date of Patent: Jun. 28, 1988

[54] CRITICAL FLOW DETECTION

[75] Inventors: Emrys H. Jones, Jr., Yorba Linda, Calif.; Joseph Messmer, Pittsburgh, Pa.

[73] Assignee: Chevron Research Company, San Francisco, Calif.

[21] Appl. No.: 935,482

[22] Filed: Nov. 26, 1986

[51] Int. Cl.$^4$ .............................................. G01F 1/42
[52] U.S. Cl. ..................................... 73/861; 73/861.61; 73/865.9; 374/54
[58] Field of Search ............ 73/861, 202, 204, 861.61, 73/861.62, 861.63, 861.64, 865.9, 168; 374/54, 135

[56] References Cited

U.S. PATENT DOCUMENTS 3,433,069 3/1969 Trageser .............................. 73/204
3,817,100 6/1974 Anderson et al. ............... 73/861.63
3,896,670 7/1975 Converse et al. ................ 73/861.63
4,317,365 3/1982 Lauterbach ......................... 73/204

FOREIGN PATENT DOCUMENTS 320812 3/1919 Fed. Rep. of Germany ........ 73/204

Primary Examiner—Herbert Goldstein
Attorney, Agent, or Firm—S. R. La Paglia; E. J. Keeling; E. A. Schaal

[57] ABSTRACT

The invention provides a method and apparatus for determining when critical flow conditions are reached in a nozzle. The apparatus comprises a flow nozzle having a throat therein, a means for measuring temperature in the throat, a means for measuring temperature downstream of the throat, and a means for determining differential temperature between the throat and the downstream location. The method comprises measuring a temperature in the throat of the critical flow nozzle, measuring the temperature downstream of the nozzle, and adjusting an upstream pressure to maximize the difference between the throat and the downstream location.

6 Claims, 2 Drawing Sheets

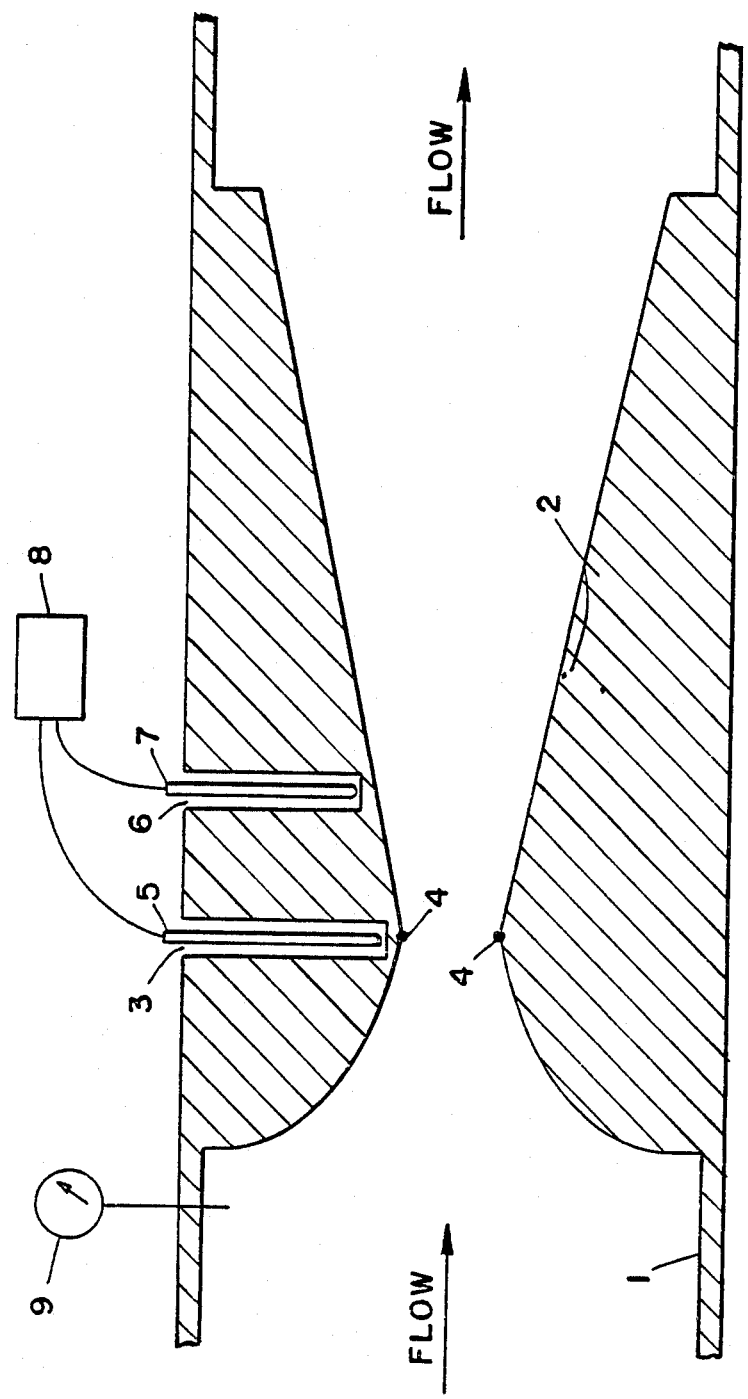
FIG_1

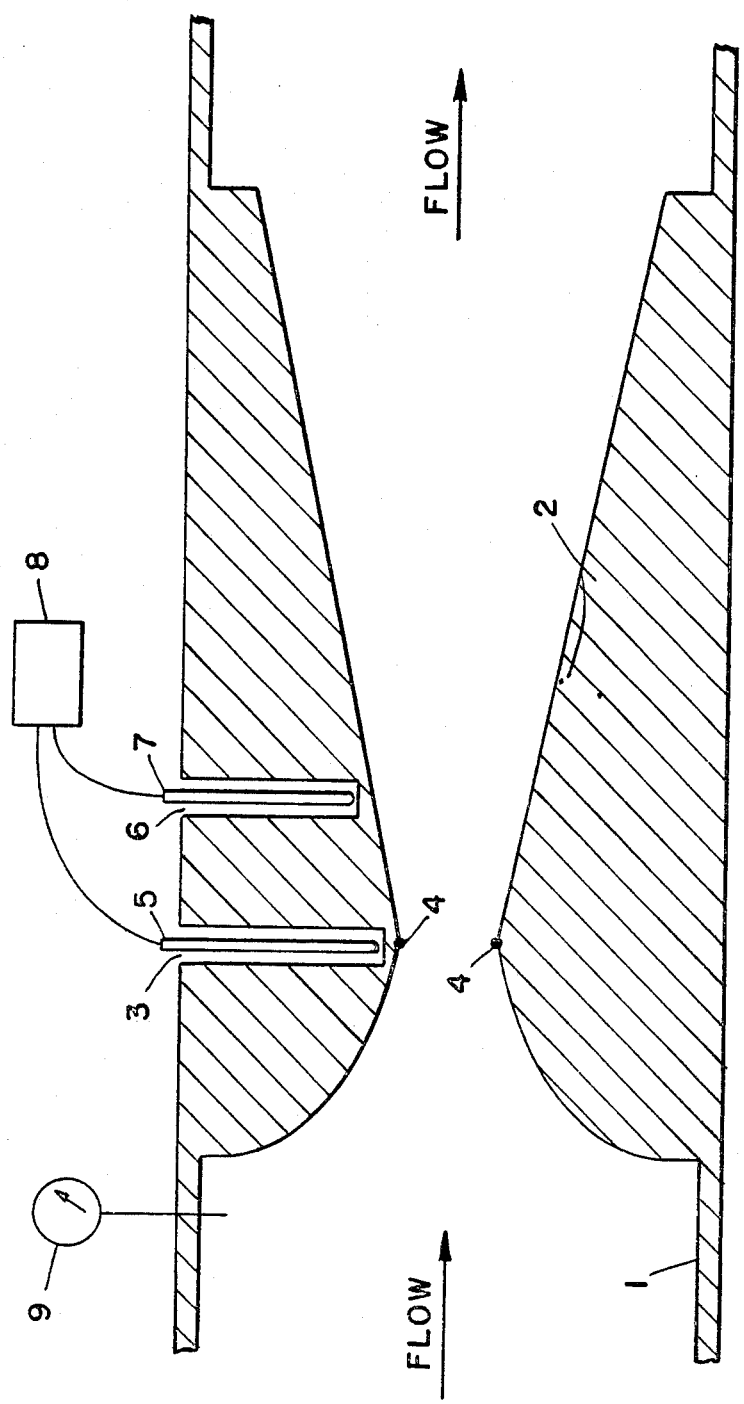
FIG_1

CRITICAL FLOW DETECTION

BACKGROUND OF THE INVENTION

1. Field of the Invention

This invention relates generally to flow detection. Specifically, this invention relates to the detection of critical flow conditions in a nozzle.

2. Background Information

Nozzles are frequently used to measure the flow rate of gas through a pipeline. When a nozzle is inserted in a flowing stream of gas, the flow rate through the nozzle will increase or decrease in proportion to the ratio of the downstream pressure ($P_2$) to the upstream pressure ($P_1$) in the flow line up to the point at which the average gas velocity reaches the speed of sound in the throat of the nozzle. The ratio of the downstream pressure to upstream pressure at this point is called the critical pressure ratio ($r_c$). Below this ratio, the gas flow rate through the nozzle is not affected by $P_2$, but instead, is a function of $P_1$ only (assuming all other conditions remain constant). Nozzles operated below the $r_c$ are commonly referred to as "critical flow nozzles" and are especially useful in flow measurement because of their dependence only on $P_1$. An application of the utility of critical flow nozzles is found in copending application Ser. No. 874,731 filed June 16, 1986, assigned to the assignee of the present invention, and is incorporated by reference herein for all purposes.

A common problem in the use of critical flow nozzles is in determining the point at which critical flow is obtained. Perry et al ("Chemical Engineers Handbook," Fifth Edition, pages 5-11 to 5-12, incorporated by reference herein) describes various equations which can be used in estimating the critical pressure ratio. For an ideal gas, the critical pressure ratio can be described by the equation:

$$r_c = \left[ \left( \frac{k+1}{2} \right) - \left( \frac{k-1}{2} \right)^{\beta 4 r_t^2/k} \right]^{k/(1-k)} \quad (1)$$

and for $\beta < 0.2$ can be approximated by:

$$r_c \cong \left( \frac{2}{K+1} \right)^{k/(k-1)} \quad (2)$$

The above equations are useful in providing an initial estimate of the critical pressure ratio. However, these equations assume, among other things, that the gas behaves as an ideal gas, and that the ratio of specific heats is precisely known. This is frequently not the case, especially in oil field operations where gas lines may be operated at extremely high pressure and where the gas stream may be a complex mixture of gases, many of which are known to exhibit non-ideal behavior at relatively low pressure (e.g. $CO_2$). Therefore, if an accurate determination of gas flow rate is desired, the nozzle will frequently be operated at pressure ratios much lower than calculated in the above equation to provide a margin of safety. This results in unnecessary pressure drop in the pipeline which can translate into significant compression costs. Further, in some cases, excess compression capacity may not be available to provide this pressure.

In summary, it is desirable to devise a method of accurately determining the point at which a nozzle has reached critical flow conditions.

SUMMARY OF THE INVENTION

The present invention provides a method and apparatus for accurately determining when critical flow conditions are reached. The device comprises a flow nozzle, a throat temperature measurement means, and a downstream temperature measurement means. The method of determining when critical flow conditions are reached comprises flowing a gas through a critical flow nozzle, measuring the temperature at the throat of the critical flow nozzle, measuring the temperature at a downstream location in the nozzle, and adjusting the pressure ratio until the differential temperature between the throat temperature measurement device and the downstream pressure measurement device substantially reaches a maximum.

BRIEF DESCRIPTION OF THE DRAWING

FIG. 1 is a cross section of a pipe containing the device described in the present invention.

FIG. 2 is a diagram showing data obtained with the present invention.

DETAILED DESCRIPTION OF THE PREFERRED EMBODIMENTS

The present invention provides a method and apparatus for accurately determining when critical flow is reached in a nozzle. Critical flow is assured when the differential temperature reaches a maximum because of heat transfer effects, the isentropic flow relations, and the normal shock wave that occurs for supersonic flows inside the nozzle. It is well established that the flow through a venturi nozzle can be approximated by one dimensional isentropic flow of a perfect gas. These flow relations show that the fluid temperature is a function only of the Mach number and the stagnation temperature of the fluid which is a constant for a given operating condition. Operation of this device can be explained by examining the temperature distribution in the nozzle for three pressure ratios ($P_2/P_1$).

For the pressure ratio when the flow is less than or sonic at the throat and no supersonic flow occurs downstream of the nozzle, the nozzle throat temperature will be the lowest temperature in the nozzle. The temperature profile for the nozzle will be referred to as the critical temperatures for the condition when the flow is sonic at the throat. It can be shown from the isentropic flow relations that the temperature difference between the throat and any other section in the nozzle is a local maximum for a Mach number of 1 over the range of throat Mach number from 0 to 1 (1 is the highest possible Mach number at the throat).

Referring to FIG. 1, for a pressure ratio low enough to cause supersonic flow downstream of the thermowell 6, the fluid temperature will be the critical temperature (as defined above) for both the nozzle throat and the thermo-well 6. On the throat side of the shock wave, the fluid temperature will be below the nozzle throat temperature and on the other side (thermo-well 6 side), the temperature will be the critical temperature.

For a pressure ratio low enough to cause supersonic flow at the location of thermo-well 6, the fluid temperature will be critical at the throat but well below the throat temperature at thermo-well 6.

In summary, as the pressure ratio decreases from 1 to a point where the flow is supersonic at thermo-well 6, the fluid temperature at the throat will decrease to its critical temperature and remains there regardless of further decreases in the pressure ratio. The temperature at thermo-well 6 will decrease to its critical temperature and remain there until the shock wave passes it at which point the temperature will fall below the throat temperature.

Because of fluid stagnation and heat transfer effects, the actual fluid temperature and a sharp delineation in temperatures is not measured near the nozzle wall. Instead, the continuous curves shown in FIG. 2 are observed. The maximum differential temperature on this curve occurs when the pressure ratio is decreased below the critical pressure ratio.

Referring further to FIG. 1, the apparatus used in the present invention consists of a pipeline 1 into which a critical flow nozzle 2 is inserted. The direction of flow in the particular type of nozzle shown would be from left to right. An upstream thermo-well 3 is inserted into the nozzle at its throat 4. The throat section may be either the "minimum area of the curve" type shown or an extended constant area section which is the minimum area for the nozzle. An upstream temperature measurement device 5 is installed in the thermo-well. Downstream of the nozzle throat, a second thermo-well 6 and temperature measurement device 7 are installed. Both the upstream and downstream temperature measurement devices are connected to temperature recording equipment 8. In the preferred embodiment, the distance from the upstream thermo-well to the downstream thermo-well is one throat diameter. For nozzles with a cylindrical throat, the downstream thermo-well is one throat diameter downstream of the end of the cylindrical throat. Pressure measurement equipment 9 is also provided upstream of the nozzle 2.

To operate the device, flow is initiated through the nozzle 2. As the downstream pressure is decreased (or the upstream pressure is increased) the pressure ratio (r) in the nozzle will decrease. The difference between the throat temperature and downstream temperature are monitored with the throat temperature probe 5, the downstream temperature probe 7, and the temperature monitoring equipment 8. When the difference reaches a maximum the pressure ratio is at the critical pressure ratio. Knowledge of this will enable one to operate a critical flow nozzle with the lowest possible pressure drop.

FIG. 2 illustrates results obtained with the present invention with four different nozzles. Table 1 illustrates typical conditions used in these experiments.

TABLE 1

| | |
|---|---|
| Upstream Pressure | 1000 psia |
| Nozzle Diameter | as shown |
| Nozzle Type | torsidal throat |
| Pipeline Diameter | 8" |
| Gas Type | natural gas |

As can be seen, a clear peak is detected under critical flow conditions.

The above detailed description is intended to be illustrative and not restrictive. The scope of the invention should be determined, therefore, not with reference to the above description, but instead to the appended claims along with the full range of equivalents to which the claims are entitled.

What is claimed is:

1. Apparatus for determining a flow rate of gas comprising:
   a pipeline;
   a nozzle, said nozzle located inside said pipeline and further comprising a throat;
   a means for measuring pressure, said means for measuring pressure located upstream of said nozzle;
   a first means for measuring temperature, said first means for measuring temperature located in said throat; and
   a second means for measuring temperature, said second means for measuring temperature located downstream of said first means for measuring temperature.

2. Apparatus as recited in claim 1 wherein said second means for measuring temperature is located substantially one throat diameter downstream of said first means for measuring temperature.

3. Apparatus as recited in claim 1 further comprising means for measuring a differential between said first means for measuring temperature and said second means for measuring temperature.

4. A method of measuring a flow rate of gas in a pipeline comprising:
   (a) flowing gas through a nozzle in the pipeline, said nozzle having a throat;
   (b) measuring a first temperature at said throat;
   (c) measuring a second temperature downstream of said throat;
   (d) calculating a difference between said first temperature and said second temperature;
   (e) adjusting a pressure ratio of the pressure downstream and the pressure upstream of said throat to substantially maximize said difference between said first temperature and said second temperature;
   (f) measuring a pressure upstream of said nozzle; and
   (g) calculating the flow rate of gas through said nozzle based on said pressure.

5. Apparatus for determining when critical flow is achieved in a critical flow nozzle comprising:
   a first temperature measurement means located substantially in a throat of said nozzle;
   a second temperature measurement means downstream of said throat; and
   means for determining a difference between said first temperature measurement means and said second temperature measurement means.

6. A method for determining when critical flow is achieved in a nozzle comprising:
   (a) measuring a first temperature in a throat of said nozzle;
   (b) measuring a second temperature downstream of said throat; and
   (c) adjusting a pressure ratio of the pressure downstream and the pressure upstream of said throat to substantially maximize said difference between said first temperature and said second temperature.

* * * * *